United States Patent [19]

Burba, III et al.

[11] Patent Number: 4,990,268

[45] Date of Patent: Feb. 5, 1991

[54] MIXED METAL HYDROXIDES FOR THICKENING WATER OR HYDROPHYLIC FLUIDS

[75] Inventors: John L. Burba, III, Angleton; Greene W. Strother, Brazoria, both of Tex.

[73] Assignee: The Dow Chemical Company, Midland, Mich.

[21] Appl. No.: 60,133

[22] Filed: Jun. 9, 1987

Related U.S. Application Data

[63] Continuation of Ser. No. 752,325, Jul. 5, 1985, abandoned.

[51] Int. Cl.$^5$ .......................... C09K 7/02; B01J 13/00
[52] U.S. Cl. .................. 252/8.514; 252/8.512; 252/71; 252/174.25; 252/184; 252/315.01; 252/315.7; 423/600
[58] Field of Search .............. 252/8.511, 8.512, 8.551, 252/184, 315.01, 315.7, 8.514; 423/600

[56] References Cited

U.S. PATENT DOCUMENTS

| | | | |
|---|---|---|---|
| 2,571,093 | 10/1951 | Temple | 252/8.511 |
| 3,567,472 | 3/1971 | Bratton | 501/120 |
| 3,749,589 | 7/1973 | Sparlin et al. | 252/8.551 X |
| 4,392,979 | 7/1983 | Lee et al. | 252/184 |
| 4,446,201 | 5/1984 | Lee et al. | 428/696 |

*Primary Examiner*—Richard D. Lovering
*Attorney, Agent, or Firm*—W. J. Lee

[57] ABSTRACT

Novel monodispersed crystalline mixed metal layered hydroxide compounds of the general formula are prepared:

$Li_m D_d T(OH)_{(m+2d+3+na)} A_a{}^n$, where m is an amount from zero to 1; D is a divalent metal; d is the amount of D ions of from zero to 4; T is a trivalent metal; A represents anions or negative-valence radicals of valence n; na is from zero to $-3$; $(m+d)$ is greater than zero; and $(m+2d+3+na)$ is equal to or greater than 3. The D metal is preferably Mg and the T metal is preferably Al. These compounds are useful as gelling agents which impart beneficial thixotropic properties to various fluids, such as drilling fluids, especially when employed along with fluid loss agents.

44 Claims, No Drawings

MIXED METAL HYDROXIDES FOR THICKENING WATER OR HYDROPHYLIC FLUIDS

This is a continuation of application Ser. No. 752,325, filed July 5, 1985, now abandoned.

FIELD OF THE INVENTION

Thickening of water or hydrophylic fluids by use of mixed metal layered hydroxides.

BACKGROUND OF THE INVENTION

There are various reasons for thickening water, aqueous solutions, hydrophilic fluids, and the like, such as for use as water-based metal working fluids, fire control fluids, oil field drilling fluids, food additives, hydraulic fluids, water-based paints or coatings, stripping solutions, and other applications wherein thickening of a liquid or solution is beneficial.

Water thickening agents, such as guar gum and polyacrylamide are not stable to high shear, hydrothermal treatment above about 250° F. (121° C.), oxidation, bacterial attack, and salts. To make up for some of these problems, such additives as bacteriacides and antioxidants are sometimes required.

Thickening agents or viscosifying agents for aqueous materials, such as drilling fluids, which involve some form of hydrous aluminum compound are disclosed, for example, in U.S. Pat. Nos. 4,240,915, 4,349,443, 4,366,070, 4,389,319, 4,428,845, 4,431,550, 4,447,341, 4,473,479, and 4,486,318. Patents disclosing other forms of aluminum compounds for the same purpose are, e.g., U.S. Pat. Nos. 4,240,924, 4,353,804, 4,411,800, and 4,473,480. Similar patents disclosing other types of viscosifying agents are, e.g., U.S. Pat. Nos. 4,255,268, 4,264,455, 4,312,765, 4,363,736, and 4,474,667.

These patents deal with the formation of the hydrous aluminum compounds in-situ. The major disadvantages to such a process are: (1) The resulting thickened fluid contains copious amounts of reaction salts. This may be undesirable in many situations. For example, in applications such as paints, metal working fluids, or water-based hydraulic fluids, the presence of salt could cause severe corrosion problems. In the case of oil field drilling fluids, many performance additives do not work well if salt is present. Thus it is desirable to drill in fresh water if possible. (2) The reactions described in the cited patents are run in-situ (e.g. in the mud pit of a drilling rig); under such conditions the reaction cannot be adequately controlled and the properties of the resultant thickener may be unpredictable.

Other problems with the use of $Al(OH)_3$ as a gelling agent for processes such as oilfield drilling fluids are as follows:

1. $Al(OH)_3$ gels are known to detrimentally change with time unless certain anions such as carbonate or citrate are present.

2. The rheology of $Al(OH)_3$ is not very constant with changing pH values. For example, a slurry of $Al(OH)_3$ may be very thick and uniform at pH 6 but at pH 10, which the drilling industry prefers, the slurry collapses and the $Al(OH)_3$ settles out of suspension. This creates significant problems since most drilling operations are run at pH values in the range of 9 to 10.5.

A historically popular thickening agent, especially in drilling mud, has been mineral clays, such as bentonite clay, often used with other agents or densifiers, such as $Fe_2O_3$, $BaSO_4$ and others. Variations from batch to batch of bentonite clay, and sensitivities to ions and temperature have resulted in erratic results and adjustment of the formulation is often required during use; this hampers the drilling operation.

Certain forms of crystalline layered mixed metal hydroxides are disclosed, e.g., in U.S. Pat. Nos. 4,477,367, 4,446,201, and 4,392,979, wherein various Li, Mg, Cu, Zn, Mn, Fe, Co, and Ni compounds form part of the crystal structure. Other layered compounds are disclosed, e.g., in U.S. Pat. Nos. 2,395,931, 2,413,184, 3,300277, and 3,567,472. These compounds are prepared through various reactions including coprecipitations, intercalations, acid digestions and base digestions.

In the drilling of oil wells, drilling fluids or "muds" perform several functions:

1. They remove cuttings from the hole.
2. They cool the drill bit.
3. They provide hydrostatic pressure to balance formation pressure.
4. They control ingress of fluids into the formation and protect the formation.

In order to perform some of these functions it is necessary for the fluid to possess pseudoplastic rheology. There are several shear zones in the bore hole of a well and the fluid should have varying viscosities in these zones. In the annulus between the drill pipe and the formation, the shear rate is approximately 100 to 1000 $sec^{-1}$. At the drill bit the shear rate is between about 25,000 and 200,000 $sec^{-1}$. In the mud pit the shear rate is less than 30 $sec^{-1}$. In order to carry drill solids at low shear rates, a fluid must have a significant viscosity. However, if the fluid has a high viscosity at the drill bit, a significant amount of energy is lost in pumping the fluid. Thus, a good drilling fluid should be shear thinning. It is very important that the fluid maintain this rheology throughout the drilling process. However, many adverse conditions that typically inhibit the performance of existing drilling fluids are, the presence of various cations (such as calcium and magnesium), fluctuating salt concentrations, high temperatures, oxidative conditions, and the presence of bacteria.

Some of the commercially accepted gelling agents that are used in water-based drilling fluids are polymers such as xanthan gum, guar gum and polyacrylamides. Nonpolymer gelling agents are typically clays such as bentonite and attapulgite. Each of these gelling agents has its own limitations. The polymers typically have instability to various salts, they are susceptible to oxidation and bacterial attack, they break down under extensive shear, and they are thermally stable to only about 120° to 150° C. The most popular clay gelling agent is bentonite. This material is severely affected by polyvalent cations and is limited to about 100° C. unless certain thinners are incorporated. However, bentonite cannot be oxidized under hydrothermal conditions, and it is stable in a liquid carrier to high shear conditions.

SUMMARY OF THE INVENTION

In accordance with the present invention there is provided a novel gelling component of a process fluid, for example, a drilling fluid, drilling mud, frac fluid, packer fluid, completion fluid, and the like, or other thixotropic fluid, said gelling component, also referred to as a thickening agent, comprising a mixed metal layered hydroxide of the empirical formula $$Li_m D_d T(OH)_{(m+2d+3+na)} A_a^n, \text{ where}$$

m is the number of Li ions in the formula;

D represents divalent metal ions and d is the number of ions of D in the formula;

T represents trivalent metal ions;

A represents monovalent or polyvalent anions other than the $OH^-$ ions; a is the number of ions of A in the formula; n is the valence of A; na is from zero to $-3$; and where $(m+2d+3+na)$ is equal to or greater than 3.

These layered mixed metal hydroxides are preferably prepared by an instantaneous ("flash") coprecipitation wherein soluble compounds, e.g., salts, of the metals are intimately mixed (using non-shearing agitation or mixing) with an alkaline material which supplies hydroxyl groups to form the mixed metal hydrous oxide crystals. While the empirical formula appears to be similar to previously disclosed compositions, a distinguishing feature of this present composition is that the crystals are essentially monolayer, or one layer of the mixed metal hydroxide per unit cell. In a liquid carrier they are essentially "monodispersed" meaning individual crystals are distinct layers of the mixed metal hydroxide. These monodispersed, monolayer crystals are believed to be novel.

DETAILED DESCRIPTIONS

In the above formula, the Li and the value of m may be about zero to about 1, preferably about 0.5 to about 0.75, when used.

The D metal may be Mg, Ca, Ba, Sr, Mn, Fe, Co, Ni, Cu, Zn, preferably Mg, Ca, Mn, Fe, Co, Ni, Cu, or Zn, most preferably Mg or Ca or mixtures of these, and the value of d may be about zero to about 4, preferably about 1 to about 3, most preferably about 1.

The amount of $(m+d)$ is greater than zero.

The T metal may be Al, Ga, Cr, or Fe, preferably Al or Fe, most preferably Al.

In the subscript $(m+2d+3+na)$ the na is actually a negative number because the anion valence, n, is negative. Addition of a negative number results in a subtraction.

The A anions may be monovalent, divalent, trivalent, or polyvalent, and may be inorganic such as halide, sulfate, nitrate, phosphate, or carbonate, preferably halide, sulfate, phosphate or carbonate, or they may be hydrophilic organic ions such as glycolate, lignosulfate, polycarboxylate or polyacrylate. These anions often are the same as the anions which formed part of the metal compound precursors from which these novel crystals are formed.

The liquid which is gelled by the presently described novel mixed metal hydroxides may be an aqueous liquid, such as water or aqueous solution, or a hydrophylic organic material such as alcohol or ketone; also a dispersion or emulsion comprising an aqueous medium which contains non-soluble ingredients (organic and/or inorganic) in dispersed form can be gelled by use of the presently described gelling agent. Whereas the present gelling agent is found useful as a thickening agent for water-based metal working fluids, fire fighting fluids, food additives, hydraulic fluids, latex paints, stripping fluids, lubricants, and others, especially where extreme pseudoplasticity is a desirable property, it is particularly useful when employed as an additive to form thixotropic fluids for use in subterranean operations, such as drilling fluids, drilling muds, fracture fluids, packer fluids, completion fluids, and the like, especially drilling fluids, whether it be for drilling oil wells, water wells, or gas wells, including drilling in the ocean floor.

The "flash" precipitation technique employed, in preparing the present gelling agents, closely approximates a steady-state reaction wherein the ratio of reactant feeds (cations/anions), and other reaction conditions (e.g. concentration, pH, temperature) are substantially constant. Such constant conditions are substantially achieved by mixing or combining a metered stream (or regularly fed portions) of the "cation solution" with a predetermined amount of the "anion solution"; the combined solutions comprise a mixture (containing reaction product as a floc), which is removed from the mixing area or zone. In this manner, each new portion of cation solution "sees" a new portion of anion solution, neither of these new portions having been involved in the mixing of the previous portions. Thus one obtains substantially constant conditions of temperature, pH, and ratio of feed reactants and obtains a more homogeneous, compositionally uniform product, each new portion of product having undergone the same orders (and rates) of reaction as any previous portion of product. By performing the reaction in this manner the formation of "flocs" is maximized, so long as there is not enough shearing agitation to break up the flocs.

This steady-state reaction is in contradistinction to a non-steady reaction wherein reaction conditions (such as temp., pH, ratio of reactants) are variable rather than constant. For instance, if one has a vessel containing a cation solution to which one slowly adds a stream (or portions) of the anion solution, the first bit of anion solution "sees" all the cations, the second bit sees not as many cations but sees some reaction product as well. Each subsequent bit of anion solution "sees" a different quanitity of cations and product; the ratio of cations/anions being united is changing throughout the procedure leading, very likely, to a non-homogeneous or non-uniform product as a result of there having been different orders of reactivity encountered, or different rates of reaction over the course of the anion addition. Here, in such a non-steady state reaction, one encounters the likelihood that some of the subsequent anions may react with some of the already formed product, giving rise to a mixture of products.

One may theorize that an absolutely constant, uniform product is prepared under absolutely constant conditions by reacting a molecule of one reactant with the requisite or stoichiometric molecular amount of the other reactant. Such absolutely constant conditions are not achievable in commercial practice, but one may substantially approach such conditions by employing substantially steady-state conditions where constant conditions are closely approached.

The temperature of the reacting mixture should, of course, be above freezing and not above boiling. Going above boiling would require a closed, pressured vessel to prevent evaporation of the liquid and this is generally unproductive, offering no additional benefit commensurate with the added expense. A temperature below about 5° C. would be expected to slow down the reaction rate. An ambient temperature in the range of about 15°–40° may be used, but warmer temperatures up to 80° C. or more may be quite beneficial, not only in keeping the beginning compounds in solution, but also in speeding the rate at which the compounds react.

A mixture of the selected soluble metal compounds, especially the acid salts (e.g. chloride, nitrate, sulphate, phosphate, etc.), are dissolved in an aqueous carrier.

The ratios of the metal ions in the solution are predetermined to give the ratios desired in the final product. The concentration limit of the metal compounds in the solution is governed, in part, by the saturation concentration of the least soluble of the metal compounds in the solution; any non-dissolved portions of the metal compounds may remain in the final product as a separate phase, which is not a serious problem, usually, if the concentration of such separate phase is a relatively low amount in comparison to the soluble portions, preferably not more than about 20% of the amount of soluble portions. The solution is then mixed rapidly and intimately with an alkaline source of $OH^-$ ions while substantially avoiding shearing agitation thereby forming monodispersed crystals of layered mixed metal hydroxides. One convenient way of achieving such mixing is by flowing the diverse feed streams into a mixing tee from which the mixture flows, carrying the reaction product, including the monodispersed layered mixed metal hydroxides of the empirical formula shown in the Summary above. The mixture may then be filtered, washed with fresh water to remove extraneous soluble ions (such as $Na^+$, $NH_4^+$ ions and other soluble ions) which are not part of the desired product.

The particular transmission electron microscope used in conducting crystallographic analyses of the subject mixed metal layered hydroxides was operated at its maximum limits of detection, i.e. a resolution of about 8 angstroms. The monodispersed crystals were so thin, with respect to their diameter, that some curling of the monolayer crystals was found, making precise thickness measurements difficult, but reasonable estimates place the crystal thickness in the range of about 8 to about 16 angstroms for various crystals. During the drying process some agglomeration of crystals is apparent, as detected in the analysis, giving rise to particles which contain a plurality of the monolayer unit cell structures. Many flat, unagglomerated crystals are detectable in the analyses. These monolayer unit crystals are in contradistinction to 2-layer and 3-layer unit cell structures referred to in e.g., U.S. Pat. No. 4,461,714.

One method of preparing the composition, however not exclusively the only method, is to react a solution of metal salts such as magnesium and aluminum salts (the salt concentrations are preferably less than about 2 molar and most preferably about 0.25 molar) with a source of hydroxide ion. Sodium hydroxide may be used, for instance, however, ammonium hydroxide is preferable. The concentration and the quantities of the base are at least sufficient to precipitate the mixed metal hydroxide compound. For ammonium hydroxide, the most preferable range is between 1 mole of $OH^-$ per mole of $Cl^-$ to about 1.5 moles of OH per $Cl^-$.

The precipitation should be done with little or no shear so that the resultant flocs are not destroyed. One method of accomplishing this is to flow two streams, the salt stream and the base stream, against one another so that they impinge in a low shear, converging zone such as is found in a tee. The reaction product is then filtered and washed, producing a filtercake of approximately 10% solids. At this point if the layered mixed metal hydroxide composition has been washed carefully to reduce the dissolved salt concentration to a relatively low point, for example, about 300 ppm. or less, an odd phenomenon occurs. Over a period of time, the filter cake changes from a solid waxy material to an opalescent or iridescent liquid that efficiently scatters light. If ionic material is added back to the dispersion, the viscosity increases drastically and the dispersion gels. The rate of "relaxation" is dependent on the free ion concentrations in the dispersion and will not occur if the concentrations are too high. The effect of various ions on the relaxation process differs. For example, the relaxation process is more tolerant of monovalent ions such as chloride ions than it is of polyvalent ions such as sulfate, carbonate, or phosphate.

If the relaxed dispersion is dried, when the solids level reaches about 20 to 25%, the material forms a solid hard translucent material that is very brittle. It can be crushed to a powder, even though it is approximately 80% water. This solid will not redisperse well in water or other hydrophylic solvents. Even if shear is applied with a Waring Blender or an ultrasonic cell disrupter, the solids cannot be made to form stable dispersions.

One fruitful method of drying the material is to add a quantity of hydrophylic organic material such as glycerine or polyglycol to the relaxed dispersion prior to drying. The material may be dried to about 5% water, or less, and still be redispersible. If this is done the resultant dry material will spontaneously disperse in water. If a salt is then added to this dispersion, the fluid will build viscosity in the same manner as the product that has never been dried. This drying technique does not work if significant quantities of dissolved salts are present in the dispersion. In this case some dispersion may be possible, but the resultant fluid will not build viscosity.

One of the distinguishing features of the presently disclosed mixed metal hydrous oxides is the fact that upon filtration after the flash coprecipitation there remains on the filter a gel which is predominantly the liquid phase with the crystalline hydrous oxides so swollen by the liquid that they are not visible as a solid phase. One might call the gel a "semi-solution" or "quasi-solution" and it has the appearance and feel of a semi-solid wax. This is in contradistinction to prior art hydrous oxide precipitates which are readily filtered out of liquid as a discreet particulate solid material. We would not wish to be limited by this theory, but it appears that the particular crystalline morphology obtained here permits or causes the imbibing and holding of large amounts of the liquid.

The gelling agent may also be composed of either pure mixed metal hydroxide compounds or physical mixtures of the layered compounds with themselves or other hydrous oxides of the D or T metals such as hydrous alumina, hydrous magnesia, hydrous iron oxides, hydrous zinc oxide, hydrous chromium oxides, and the like.

In each of the subsequent examples, the mixed metal layered hydroxide compound was prepared by coprecipitation. They were then filtered and washed to produce a substantially pure material. This purified product was then dispersed in water to build the thickened fluid.

In this disclosure, the following U.S. to metric conversion factors are appropriate: 1 gal=3.785 liter; 1 lb.=0.454 Kg; 1 lb/gal (U.S.)=119.83 $Kg/M^3$; 1 bbl=42 gal=159 liters; $lb/ft^2 \times 47.88 = 1$ Pascal; 1 lb/100 $ft^2$=4.88 Kg/100 $M^2$.

The following examples are to illustrate certain embodiments, but the invention is not limited to the particular embodiments shown.

EXAMPLE 1

A 0.25 molar solution of $MgCl_2 \cdot AlCl_3$ was prepared. This solution then pumped through a peristaltic pump into one arm of a tee. A 2.5 molar solution of NH$_4$OH was pumped into a second opposite arm of the tee so that the two solutions met in the tee. The product poured out of the third arm and into a beaker. The flows of the two solutions were carefully adjusted so that the product of the coprecipitation reaction would have a pH of about 9.5. In this situation that amounts to about a 10 to 20% excess of NH$_4$OH. The reactor product consisted of a delicate floc of MgAl(OH)$_{4.7}$Cl$_{0.3}$ suspended in an aqueous solution of NH$_4$Cl. The dispersion was then carefully poured into a Buchner Funnel with a medium paper filter. The product was filtered and washed in the filter with water to remove the excess NH$_4$Cl. After washing the dissolved Cl$^-$ concentration was about 300 ppm. as measured by Cl$^-$ specific ion electrode. The filter cake that resulted was translucent, but not optically clear.

The resultant cake was about 9% solids by weight, determined by drying at 150° C. for 16 hrs. The cake had the consistency of soft candle wax. The product was analysed for Mg and Al. It was found that the Mg:Al ratio was essentially 1:1.

Electron micrographic analysis of the product showed tiny platelets with diameters of 300 to about 500 angstroms. The particles were so thin that in some cases, they curled. Estimates of thicknesses of these particles are about 8 to about 16 angstroms. The maximum resolution on the microscope is about 8 angstroms. The theoretical thickness of one layer of crystalline MgAl(OH)$_{4.7}$Cl$_{0.3}$ is about 7.5 angstroms. These data strongly suggest that some of the particles are one to two crystals thick. It should also be noted that in the process of preparing the sample for electron microscopy, the material was dried which apparently caused a degree of agglomeration of the crystals.

After setting undisturbed for about 16 hours, the filter cake had the consistency of petroleum jelly. After about 48 hours, the material was a thixotropic liquid. The relaxation process continued for about 5 days. At the end of this time, the product was more viscous than water but it was pourable. A small amount of NaCl was added to a sample of the liquid and it gelled almost instantaneously.

A quantity of glycerine was added to the product that was equal to 17% by weight of the solids present in the dispersion. When the glycerine was added to the dispersion, the apparent viscosity decreased to about 1 centipoise. The slurry was then placed in a pan and dried in an oven for 16 hours. On large scale, more efficient drying equipment would be utilized, such as spray dryers or shelf dryers. The product from the oven was a brittle solid that could be easily crushed. It was 95% solids by weight, including the glycerine. When the solid material was placed in water, it spontaneously dispersed in less than 5 minutes. Phosphate ions in the form of NaH$_2$PO$_4$ were added to the dispersion and it increased in viscosity in the same way that it did before drying.

EXAMPLE 2

In a similar manner, a solution of magnesium and aluminum chlorides which had a composition of 4 magnesiums per 1 aluminum was reacted with NH$_4$OH. The concentration of Mg$_{3.2}$Al(OH)$_{8.4}$Cl$_1$ was about 1 molar. The product was filtered and washed immediately. After about 24 hours, the filter cake had relaxed to a very thin fluid. The solids content of the fluid was about 10% and the bulk analysis of the solids indicated that the Mg:Al ratio was 3.2:1.

Transmission electron microscopy was performed on the material and it was found that the product is made up of platelets having an average diameter of 500 angstroms plus or minus about 100 angstroms. Some of the crystals are lying on edge so that it is possible to estimate the crystallite thickness. It appears that there are crystals that are only about 10 angstroms thick. This suggests that the material is essentially monodispersed. The literature (*Crystal Structures of Some Double Hydroxide Minerals* Taylor, H. F. W., Mineralogical Magazine, Volume 39, Number 304, Dec. 1973) teaches that known magnesium aluminum hydroxide compounds having Mg:Al ratios as high as 4:1 are in the hydrotalcite class of compounds. The crystal structure data that has been accumulated in the literature indicates that there are basically two types of hydrotalcite, one having a c-axis spacing of about 24 angstroms and another having a c-axis spacing of about 15 angstroms. Since the data revealed here indicates that many of the crystals prepared in this example are thinner in the c direction than hydrotalcite, then the crystal structure data indicate that the material must have a crystal structure that is different than hydrotalcite.

EXAMPLE 3

One part of aqueous solution containing 23.8% by weight of MgCl$_2$.AlCl$_3$ is diluted with 4 parts of deionized water and sufficient MgSO$_4$ is added to provide a calculated ratio for Mg:Al of 4:1. The solution, at room temperature, is rapidly and thoroughly mixed, without any substantial shearing forces, with a stoichiometric quantity of NH$_4$OH, thus providing an instantaneous or flash coprecipitation of Mg$_{3.2}$Al(OH)$_{8.4}$Cl$_1$. The reaction mixture is filtered, leaving a semi-solid waxy gel on the filter which contains about 6% by wt. of the coprecipitate. The gel is washed on the filter, with additional quantities of deionized water to substantially remove extraneous material such as NH$_4$OH, SO$_4^{-2}$, and Cl$^-$. However, the final Cl$^-$ concentration was greater than 0.02 molar. The filter cake is diluted with deionized water to make a 2.5% dispersion which, measured with a Brookfield viscometer, is found to be about 556 times as viscous as water at low shear rates and is thixotrophic. Enough BaSO$_4$ was added to the aqueous slurry to raise the density to about 10 lb/gal. The BaSO$_4$ suspended well and did not settle out over a period of 6 months.

EXAMPLE 4

A similar experiment was performed in which the Mg:Al ratio was 1:4. The product was washed until the Cl$^-$ content was less than 110 ppm. Upon the addition of salt, this material was capable of building viscosity and supporting BaSO$_4$ in suspension for extended periods of time.

EXAMPLE 5 (for comparison)

MgSO$_4$.7H$_2$O was dissolved in enough water to make a 0.25 molar solution. This was then reacted with KOH to make Mg(OH)$_2$ in a reaction tee. The product was filtered and washed to essentially nil Cl$^-$ concentration. This fluid was then dispersed in water and found to be thixotropic. BaSO$_4$ was then dispersed in the slurry and it was allowed to stand undisturbed for 6 months; the BaSO$_4$ was mostly settled out of the dispersion.

EXAMPLE 6 (for comparison)

A 1-molar solution of $Al_2(SO_4)_3$ was prepared and precipitated with $NH_4OH$. The resultant product was thoroughly washed and reslurried to make a 2.5% dispersion. $BaSO_4$ was added to test the suspension characteristics of the slurry. The slurry was allowed to sit undisturbed for 6 months; the $BaSO_4$ was mostly settled out of the dispersion.

EXAMPLE 7

A 0.25 molar solution of $MgCl_2.AlCl_3$ was prepared. This solution was reacted with $NH_4OH$ to precipitate a material having a Mg:Al ratio of 1:1. The product was filtered and washed to a point that the $Cl^-$ concentration in the cake was 2800 ppm. The product was then dispersed in water forming a thixotropic slurry. It was then weighted to 9.5 lb/gal. with $BaSO_4$ and allowed to set for 6 months; there was very little settling. There was a syneresis effect in which the top 10% of the fluid was clear water, but there was only about a 10% density gradient through the remaining other 90% of the fluid.

EXAMPLE 8

100 ml. of 1 molar $MgCl_2.AlCl_3$ solution was diluted with 200 ml of deionized water and 14.7 grams of $CaCl_2$ were added. The resulting aqueous salt solution was then flash precipitated with $NH_4OH$ at a reaction pH of 10. The slurry was filtered and washed. The resulting product was then dispersed in water and weighted as described in previous examples. This slurry was also thixotropic.

EXAMPLE 9

A fairly large quantity of flash precipitated $MgAl(OH)_{4.7}Cl_{0.3}$ was prepared and washed. The following tests were then performed on fluids containing the gelling agent.
1. Rheology data
2. Shear stability
3. Time dependence
4. pH dependence
5. KCl dependence
6. $CaCl_2$ dependence
7. Filtration data
8. Weighted fluids
9. Thermal stability
10. $Na_2SO_3$ stability

Rheology Data

The rheology data that is illustrated here was obtained using a Fann 35 rotary viscometer. Unless otherwise stated all of the data were obtained at 46° C. Table 1 is a comparison of plastic viscosity yield point and 10 sec and 10 min gel strengths for 7 lb/bbl $MgAl(OH)_{4.7}Cl_{0.3}$, 15 lb/bbl Aquagel, (a beneficiated sodium bentonite marketed by Baroid), and 20 lb/bbl Aquagel. The most notable differences are in the plastic viscosities and gel strengths. In the case of the $MgAl(OH)_{4.7}Cl_{0.3}$ the plastic viscosity is very low, being about one eighth of the value of the yield point. In the case of the Aquagel samples, the plastic viscosity is greater than the yield point. The gel strengths of the $MgAl(OH)_{4.7}Cl_{0.3}$ are nearly equal while those of the Aquagel fluids are significantly different. These data indicate that the $MgAl(OH)_{4.7}Cl_{0.3}$ fluid gels very rapidly and does not continue to build gel strength. Such a fluid is said to produce "fragile gels". The Aquagel fluids gel more slowly and continue to build over a longer period of time forming "progressive gels". Fragile gels are more desirable for the drilling of oil wells because the fluid will not become so strongly gelled that it cannot be easily broken.

TABLE 1

RHEOLOGY DATA

| Agent/ Concentration | Plastic Viscosity (cp) | Yield Point (lb/100 ft.$^2$) | Gel strengths 10 sec (lb/100 ft.$^2$) | Gel strengths 10 min (lb/100 ft.$^2$) |
|---|---|---|---|---|
| $MgAl(OH)_{4.7}Cl_{0.3}$ 7 lb/bbl | 2.5 | 21 | 9.5 | 11.0 |
| Aquagel* 15 lb/bbl | 7.8 | 4.5 | 1.8 | 2. |
| Aquagel* 20 lb/bbl | 15 | 14.5 | 3.0 | 8.5 |

*Aquagel is used here for comparison not as invention.

Table 2 tabulates shear stress and shear rate data for a 7 lb/bbl slurry prepared with $MgAl(OH)_{4.7}Cl_{0.3}$. These data were generated using a capillary viscometer. The fluid is extremely shear thinning from about 1 sec$^{-1}$ to about 25,000 sec$^{-1}$ where it becomes newtonian. This is typical of all water based drilling fluids. The viscosity of this fluid at low shear rates is about 600 cp but, at the drill bit, the viscosity is only about 4.5 cp.

TABLE 2

CAPILLARY VISCOMETRY DATA

| Shear Rate (sec$^{-1}$) | Shear Stress (kg/100 m$^2$) | Shear Stress (lb/100 ft.$^2$) | Viscosity (cp) |
|---|---|---|---|
| 10.35 | 59.08 | 12.10 | 597.40 |
| 20.60 | 80.56 | 16.50 | 409.30 |
| 40.95 | 92.28 | 18.90 | 235.85 |
| 102.80 | 114.25 | 23.40 | 116.32 |
| 204.48 | 130.36 | 26.70 | 66.72 |
| 393.00 | 152.14 | 31.16 | 40.52 |
| 666.75 | 179.67 | 36.80 | 28.20 |
| 981.00 | 190.71 | 39.06 | 20.35 |
| 1257.50 | 227.03 | 46.50 | 18.90 |
| 1720.00 | 230.74 | 47.26 | 14.04 |
| 2527.60 | 292.95 | 60.00 | 12.13 |
| 6551.60 | 394.50 | 80.80 | 6.30 |
| 13694.20 | 687.93 | 140.90 | 5.26 |
| 25552.40 | 1098.55 | 225.00 | 4.50 |
| 61743.30 | 2735.62 | 560.30 | 4.64 |
| 87019.00 | 3961.11 | 811.30 | 4.76 |

Shear Stability Data

Table 3 tabulates plastic viscosity, yield point, and gel strengths versus time of shear in a Waring Blender. Except for some change in the first few minutes, the viscosity parameters remain fairly constant. The capillary viscometry data also indicate that the $MgAl(OH)_{4.7}Cl_{0.3}$ fluids are shear stable since they were passed through the capillary viscometer three times and no observable shear degradation occurred.

TABLE 3

SHEAR STABILITY DATA

| Shear Time (min) | Plastic Viscosity(cp) | Yield Point (lb/100 ft.$^2$) | Gel-strengths 10 sec (lb/100 ft.$^2$) | Gel-strengths 10 min (lb/100 ft.$^2$) |
|---|---|---|---|---|
| 0.0 | 3.0 | 15.0 | 13.0 | 15.0 |
| 10.0 | 2.0 | 8.0 | 8.0 | 7.0 |
| 35.0 | 2.0 | 8.0 | 8.0 | 8.0 |
| 75.0 | 2.5 | 11.0 | 9.0 | 10.0 |

Time Dependence Data

Table 4 lists the plastic viscosity, yield point and gel strengths for a 7 lb/bbl. $MgAl(OH)_{4.7}Cl_{0.3}$ slurry over a period of 2.5 days. These data indicate that there is some change in yield point over the first several days. However, the change is not considered to be significant. The fluids from these tests were also allowed to set for 3 months and the rheology was again measured on them. There were virtually no changes in the fluids.

TABLE 4
TIME DEPENDENCE DATA

| Time days | Plastic Viscosity(cp) | Yield Point (lb/100 ft.$^2$) | Gel-strengths | |
|---|---|---|---|---|
| | | | 10 sec (lb/100 ft.$^2$) | 10 min (lb/100 ft.$^2$) |
| 0.0 | 5.0 | 5.5 | 3.0 | 6.0 |
| 0.3 | 5.0 | 7.0 | 3.5 | 6.0 |
| 1.0 | 5.0 | 7.0 | 3.5 | 5.8 |
| 2.0 | 5.0 | 6.2 | 3.5 | 5.8 |
| 2.5 | 5.0 | 6.0 | 3.5 | 5.5 | pH Effects

Table 5 lists plastic viscosity, yield point, and gel strengths versus pH. Below about 6 pH the yield point drops off drastically. It is flat to about 11 pH. Above that point, it increases very rapidly. These results are good since the drilling operations are run from about 9.5 to about 10.5 pH.

TABLE 5
pH EFFECTS ON FRESH WATER SYSTEMS

| pH | Plastic Viscosity (cp) | Yield Point (lb/100 ft.$^2$) | Gel-strengths | |
|---|---|---|---|---|
| | | | 10 sec (lb/100 ft.$^2$) | 10 min (lb/100 ft.$^2$) |
| 4.5 | 3.0 | 2.5 | 2.5 | 5.0 |
| 7.0 | 3.0 | 22.0 | 7.0 | 7.0 |
| 10.5 | 3.0 | 25.0 | 20.0 | 21.0 |
| 12.0 | 3.0 | 55.0 | 12.0 | 12.0 |

Table 6 tabulates rheology parameters for a fluid composed of 35% $CaCl_2$ and about 6 lb/bbl of $MgAl(OH)_{4.7}Cl_{0.3}$ at 6 pH and 8.5 pH. There is basically no change in rheology.

TABLE 6
pH DATA*

| pH | Plastic Viscosity (cp) | Yield Point (lb/100 ft.$^2$) | Gel-strengths | |
|---|---|---|---|---|
| | | | 10 sec (lb/100 ft.$^2$) | 10 min (lb/100 ft.$^2$) |
| 6.0 | 8.5 | 14 | 6.5 | 8.5 |
| 8.5 | 8.0 | 14 | 8.0 | 10 |

*$CaCl_2$ concentration = 35%, Fluid weight = 11 lb/gal.

KCl and CaCl$_2$ Stability Data

KCl is often added in varying quantities to water-based drilling fluids for shale stabilization. Table 7 is a listing of the various rheological properties against KCl concentration from 0% to 27%. The experiment was performed by starting with an aqueous dispersion of $MgAl(OH)_{4.7}Cl_{0.3}$ and adding quantities of KCl to the slurry. Increasing KCl concentrations had very little effect on the overall rheology of the fluid. A similar experiment was performed with $CaCl_2$, Table 8, where a drop in yield point is observed between 0.25% and 27.7%. There is also an increase in plastic viscosity. However, these changes are not of great magnitude. These data are important because they indicate that fluctuations in commonly encountered salts will not have a detrimental effect on the properties of aqueous dispersions of $MgAl(OH)_{4.7}Cl_{0.3}$.

TABLE 7
KCl STABILITY DATA*

| Concentration KCl (Wt. percent) | Plastic Viscosity (cp) | Yield Point (lb/100 ft.$^2$) | Gel-strengths | |
|---|---|---|---|---|
| | | | 10 sec (lb/100 ft.$^2$) | 10 min (lb/100 ft.$^2$) |
| 0.00 | 4.5 | 11.0 | 7.5 | 8.0 |
| 0.25 | 3.2 | 8.5 | 9.0 | 7.5 |
| 0.50 | 3.2 | 9.0 | 6.0 | 5.5 |
| 1.00 | 3.0 | 10.0 | 5.5 | 5.5 |
| 3.00 | 2.5 | 12.0 | 5.5 | 5.0 |
| 10.0 | 3.5 | 10.0 | 6.5 | 5.5 |
| 27.0 | 3.2 | 11.0 | 6.5 | 5.5 |

*$MgAl(OH)_{4.7}Cl_{0.3}$ concentration = 7 lb/bbl.

TABLE 8
CaCl$_2$ STABILITY DATA

| Concentration CaCl$_2$ (wt. percent) | Plastic Viscosity (cp) | Yield Point (lb/100 ft.$^2$) | Gel-strengths | |
|---|---|---|---|---|
| | | | 10 sec (lb/100 ft.$^2$) | 10 min (lb/100 ft.$^2$) |
| 0.35 | 2.5 | 21.0 | 9.5 | 11.0 |
| 27.7 | 6.5 | 15.0 | 8.5 | 8.5 |
| 35.0 | 8.0 | 15.0 | 8.0 | 10.0 |

Filtration Data

Aqueous dispersions of $MgAl(OH)_{4.7}Cl_{0.3}$ exhibit very high A.P.I. fluid loss values. Thus, it is generally desirable to add fluid loss control agents to a drilling fluid built around mixed metal layered hydroxides. However, it has been found that the addition of commercially available fluid loss control agents such as starch, polyacrylates, carboxy methyl cellulose, and the like provide adequate fluid loss control (less than 10 cc. loss in 30 min. using an A.P.I. fluid loss cell). The quantities required to give adequate control are roughly the amounts suggested by the manufacturers of the agents. Some of these data are listed in Table 9. As would be expected, the presence of drill solids such as shales is also beneficial to fluid loss control. More than one fluid loss agent may be used in a drilling fluid.

TABLE 9
FILTRATION DATA*

| Fluid loss control agents | Concentration to produce 12cc or less API fluid loss (lb/bbl) |
|---|---|
| Hydroxyethylcarboxymethyl-cellulose | 1.5 |
| Hydroxyethylcarboxymethyl-cellulose (low viscosity) | 2.0 |
| Cornstarch | 6.0 |
| Sodium polyacrylate | 2.0 |

*7 lb/bbl $MgAl(OH)_{4.7}Cl_{0.3}$ and 10 lb/bbl bentonite (simulated drill solids)

Weighted Fluids

Table 10 lists rheology data for 9.5 and 15 lb/bbl fluids weighted with $BaSO_4$. One unexpected result is that the plastic viscosity remains very low while there is a high yield point. This runs against current theories concerning viscosities of aqueous dispersions. It is typically thought that as weighting material is added to an aqueous dispersion, the plastic viscosity must increase drastically. One possible explanation is that the $MgAl(OH)_{4.7}Cl_{0.3}$ may be acting as a lubricant in the system. The potential outcome of such a property is that higher penetration rates may be achieved with weighted fluids than are currently possible.

TABLE 10

WEIGHTED FLUIDS DATA

| Mud Weight (lb/gal.) | Plastic Viscosity (cp) | Yield Point (lb/100 ft.$^2$) | Gel-strengths 10 sec (lb/100 ft.$^2$) | Gel-strengths 10 min (lb/100 ft.$^2$) |
|---|---|---|---|---|
| 9.5 | 3.0 | 24.5 | 11.0 | 15.0 |
| 15.0 | 4.0 | 32.0 | 14.0 | 14.0 |

Thermal Stability Data

Table 11 illustrates shear stress versus shear rate curves for an 8 lb/bbl fluid before and after static thermal treatment at 400° F. (204° C.) for 20 hours. The result of the test is that the rheological properties, measured at 115° F. (46° C.) were basically unchanged.

TABLE 11

THERMAL STABILITY DATA*

| Thermal Conditioning | Plastic Viscosity (cP) | Yield Point (lb/100 ft.$^2$) | Gel-strengths 10 sec (lb/100 ft.$^2$) | Gel-strengths 10 min (lb/100 ft.$^2$) |
|---|---|---|---|---|
| 46° C./24 hrs. | 2.5 | 21.0 | 9.5 | 11.0 |
| 204° C./24 hrs. | 2.5 | 20.0 | 8.6 | 10.0 |

*7 lb/bbl slurry in 3% NaCl.

Na$_2$SO$_3$ Stability

Na$_2$SO$_3$ is commonly added to aqueous drilling fluids in order to control corrosion by scavenging oxygen. Table 12 shows the effect of adding 1500 ppm of Na$_2$SO$_3$ to an aqueous dispersion of MgAl(OH)$_{4.7}$Cl$_{0.3}$. The effect is that the viscosity is generally increased. Typical levels of Na$_2$SO$_3$ are about 100 to 200 ppm.

TABLE 12

STABILITY TO Na$_2$SO$_3$*

| Na$_2$SO$_3$ Concentration (ppm.) | Plastic Viscosity(cP) | Yield Point (lb/100 ft.$^2$) | Gel-strengths 10 sec (lb/100 ft.$^2$) | Gel-strengths 10 min (lb/100 ft.$^2$) |
|---|---|---|---|---|
| 0.0 | 2.0 | 23.0 | 8.0 | 8.0 |
| 1500.0 | 4.0 | 32.0 | 8.0 | 8.0 |

*9 lb/bbl. MgAl(OH)$_{4.7}$Cl$_{0.3}$.

EXAMPLE 10

A very pure, low salt concentration, monodispersed mixed metal layered hydroxide of the formula MgAl(OH)$_{4.7}$Cl$_{0.3}$ at a concentration of 7 lbs. per bbl of aqueous solution was mixed with various weight ratios of NaH$_2$PO$_4$.H$_2$O and the viscosity properties at various shear rates (RPM of agitation) were obtained. These data and other rheological properties are shown in Table 13. All tests were made at ambient temperatures in the range of about 74°–78° F. (about 23°–26° C.).

The addition of PO$_4^{-3}$ ions increases the viscosity significantly. Similar, but less pronounced, results are obtained with other salts, such as NaCl, Na$_2$CO$_3$, CaCl$_2$, and the like.

TABLE 13

| Test* | Ratio of NaH$_2$PO$_4$.H$_2$O/MgAl(OH)$_{4.7}$Cl$_{0.3}$ | | | | | | | | |
|---|---|---|---|---|---|---|---|---|---|
| | 0.0 | 0.1 | 0.2 | 0.3 | 0.4 | 0.5 | 0.6 | 0.7 | 0.8 |
| 600 rpm | 5 | 27.5 | 28.5 | 27 | 27 | 25 | 24.5 | 21 | 20 |
| 300 rpm | 3 | 23 | 24 | 22.5 | 23 | 21.5 | 20.5 | 18 | 16 |
| 200 rpm | 2 | 19 | 20 | 19.5 | 20 | 19.5 | 18 | 15.5 | 14 |
| 100 rpm | 1 | 15.5 | 16.5 | 16 | 17 | 17.5 | 15 | 13.5 | 12 |
| 6 rpm | — | 10 | 10.5 | 10 | 11.5 | 12.5 | 11 | 10.5 | 9 |
| 3 rpm | — | 8.5 | 7.5 | 6 | 7 | 7.5 | 7 | 8 | 7.5 |
| Plastic Viscosity, cp | 2 | 4.5 | 4.5 | 4.5 | 4 | 3.5 | 4 | 3 | 4 |
| Yield Pt., lb/100 ft$^2$ | 1 | 18.5 | 19.5 | 18 | 19 | 18 | 16.5 | 15 | 12 |
| 10-sec. gel, lb/100 ft$^2$ | 0 | 7 | 6.5 | 5.5 | 6.5 | 6.5 | 6.5 | 6 | 5.5 |
| 10-min. gel, lb/100 ft$^2$ | 0 | 6.5 | 5.0 | 4.5 | 5 | 6 | 5.5 | 5.5 | 5.5 |

*All measurements made using a Fann viscometer

EXAMPLE 11

A solution of 11.2 g of MgCl$_2$ and 32.7 g of FeCl$_3$ in 300 ml of deionized H$_2$O is reacted with a stoichiometric amount of NH$_4$OH in a manner whereby rapid, thorough mixing, without using shearing agitation, is achieved; this provides a flash precipitation of a compound conforming essentially to the approximate formula Mg$_{1.7}$Fe(OH)$_6$Cl$_{0.4}$ after filtering and washing. A 2.5% solids in water slurry exhibits thixotropic rheology.

EXAMPLE 12

In similar manner to example 11 an aqueous solution of 31.7 g AlCl$_3$.6H$_2$O, 16.96 g CaCl$_2$.2H$_2$O and 500 ml of H$_2$O is reacted with NH$_3$.H$_2$O. The slurried product, CaAl(OH)$_{4.5}$Cl$_{0.5}$ exhibits thixotropic rheology.

EXAMPLE 13

In similar manner to example 11 three samples are prepared in which aliquots of an aqueous 23.8% MgCl$_2$.AlCl$_3$ solution are mixed, respectively, with CaCl$_2$, BaCl$_2$, and ZnCl$_2$. These solutions are flash precipitated by reaction with NH$_4$OH to prepare, correspondingly MgCa$_{0.3}$Al(OH)$_6$Cl$_{0.4}$, MgBa$_{0.3}$Al(OH)$_6$Cl$_{0.4}$, and Mg$_{0.3}$Zn$_{0.3}$Al(OH)$_6$Cl$_{0.4}$. The precipitates are filtered, washed, and diluted to about 2.5% solids; each so-formed dispersion demonstrates thixotropic rheology.

EXAMPLE 14

In a similar manner to example 11, 0.125 mole of LiCl and 0.25 mole of AlCl$_3$ are dissolved in deionized H$_2$O. The resultant solution is reacted with 0.88 mole of NH$_4$OH with little or no agitation. The product, Li$_{0.5}$Al(OH)$_{3.5}$, is filtered and washed. A diluted sample, 6 lb/bbl (17.12 Kg/M$^3$), exhibits pseudoplastic rheology and, upon dispersion therein of BaSO$_4$, retains the BaSO$_4$ in suspension for extending periods of time.

EXAMPLE 15

A sample of MgAl(OH)$_{4.7}$Cl$_{0.3}$ prepared by flash precipitation was diluted to 7 lb/bbl (2% wt on a MgAl(OH)$_{4.7}$Cl$_{0.3}$ basis) and 1.5.lb/bbl of NaH$_2$PO$_4$.H$_2$O (0.4% wt on a NaH$_2$PO$_4$.H$_2$O basis) was added with mixing. The fluid immediately became thick. The fluid was allowed to sit for 4 days and a series of diluted fluids was prepared having the following concentration; 1 lb/bbl, 2 lb/bbl, 3 lb/bbl, 4 lb/bbl, 5 lb/bbl, and 6 lb/bbl fluid. The following Table 14 contains plastic viscosity and yield point data for the fluids.

TABLE 14

| Concentration In the Mixture (lb/bbl) | Yield Point (lb/100 ft$^2$) | Plastic Viscosity (cp) |
|---|---|---|
| 1 | 1 | 1 |
| 2 | 2 | 1 |
| 3 | 9 | 2 |
| 4 | 14 | 2 |
| 5 | 18 | 2 |
| 6 | 22 | 3 |
| 7 | 28 | 3 |

EXAMPLE 16

Quantities of 120.7 g of AlCl$_3$.6 H$_2$O, and 101.7 g of MgCl$_2$.6H$_2$O, were dissolved in 4 liters of deionized water. 20 g of NaOH pellets were dissolved in 2 liters of deionized water. These two stock solutions were pumped against one another in a tee. The resultant flocs were collected, filtered and washed. The resultant product was used to prepare a 7 lb/bbl MgAl(OH)$_{4.5}$Cl$_{0.5}$ fluid in water. The fluid was thickened with NaH$_2$PO$_4$. The fluid was very thixotropic and capable of supporting BaSO$_4$ and drill solids.

EXAMPLE 17

A solution containing 0.5 molar MgCl$_2$ and 0.25 molar AlCl$_3$ was prepared in deionized water. This solution was pumped into a tee against an appropriate volume of 0.5 molar NH$_4$OH. The reaction product pH was 9.5. The product was filtered and washed and the composition was checked. It was found that the approximate composition was Mg$_{1.81}$Al(OH)$_{5.88}$Cl$_{0.74}$.2.2 H$_2$O. The product was used to prepare a 7 lb/bbl fluid containing NaH$_2$PO$_4$. The fluid was thixotropic and was capable of supporting BaSO$_4$ and drill solids.

EXAMPLE 18

In a manner similar to Example 17, a solution containing 0.75 molar MgCl$_2$ and 0.25 molar AlCl$_3$ was prepared in deionized water. This solution was pumped into a tee against an appropriate volume of 0.5 molar NH<OH. The reaction product pH was 9.5. The product was filtered and washed and the composition was checked. It was found that the approximate composition was Mg$_{2.58}$Al(OH)$_{7.14}$Cl$_{1.01}$.2H$_2$O. The product was used to prepare a 7 lb/bbl fluid containing NaH$_2$PO$_4$. The fluid was thixotropic and was capable of supporting BaSO$_4$ and drill solids.

EXAMPLE 19

In a manner similar to Example 17, a solution containing 1.5 molar MgCl$_2$ and 0.25 molar AlCl$_3$ was prepared in deionized water. This solution was pumped into a tee against an appropriate volume of 0.5 molar NH$_4$OH. The reaction product pH was 9.5. The product was filtered and washed and the composition was checked. It was found that the approximate composition was Mg$_{3.76}$Al(OH)$_{9.5}$Cl$_{1.02}$.2H$_2$O. The product was used to prepare a 7 lb/bbl fluid containing NaH$_2$PO$_4$. The fluid was thixotropic and was capable of supporting BaSO$_4$ and drill solids.

EXAMPLE 20

Monolayer Li$_{0.5}$Mg$_{0.75}$Al(OH)$_{4.6}$Cl$_{00.4}$ is prepared by mixing together 500 ml of 1 molar LiCl, 750 ml of 1 molar MgCl$_2$ and 1 liter of 1 molar AlCl$_3$, then flash precipitating the monolayer crystals by conveying a stream of the solution with a stream of NH$_4$OH, the precipitate being a floc. After filtering and washing, a waxy-like filter cake is obtained which is about 4.23% solids by weight. The cake is diluted to 2% in water (i.e. about 7lbs/bbl) and tested with viscosifiers added, each in the amount of about 0.5 lb/bbl, as shown in Table 16 below.

TABLE 16

| Viscosifier | Plastic Viscosity (cp) | Yield Point (lb/100 ft$^2$) |
|---|---|---|
| None (control) | 4.0 | 7.0 |
| NaH$_2$PO$_4$ | 6.5 | 15.5 |
| NaHCO$_3$ | 4.0 | 7.0 |
| Al$_2$SO$_4$.9H$_2$O | 4.5 | 7.0 |

MISCELLANEOUS PROPERTIES

Due to the chemical composition it is essentially impossible to oxidize MgAl(OH)$_{4.7}$Cl$_{0.3}$. This is of great interest to the oil industry since it is not possible to totally eliminate oxygen and heat in drilling operations.

MgAl(OH)$_{4.7}$Cl$_{0.3}$ is also uneffected by typical bacteria. Samples of formulated fluids have been stored with periodic exposure to the air for about 6 months and no bacterial colonies have been observed.

MgAl(OH)$_{4.7}$Cl$_{0.3}$ is also totally soluble in mineral acids. This is of great importance since it is often desirable to acidize formations after a well is drilled.

We claim:

1. Monodispersed crystalline monolayer mixed metal hydroxide compounds conforming essentially to empirical formula Li$_m$D$_d$T(OH)$_{(m+2d+3+na)}$A$_a^n$, where D represents divalent metal ions, T represents trivalent metal ions, A represents monovalent or polyvalent anions or negative-valence radicals other than OH$^-$ ions, m is from about zero to about 1, representing the amount of Li ion, d is from about zero to about 4, (m+d) is greater than zero, na is from about zero to about −3, a is an amount of A ions of valence n, and where (m+2+3+na) is equal to or greater than 3, said compounds being characterized as being substantially monolayer unit cell crystals having a thickness in the range of about 8 to about 16 angstroms.

2. The compound of claim 1 wherein the value of m is in the range of about 0.5 to about 0.75.

3. The compound of claim 1 wherein the value of d in the formula is in the range of about 1 to about 3.

4. The compound of claim 1 wherein the value of a in the formula is in the range of about 0.1 to 1.0.

5. A composition comprising the compound of claim 1 when dispersed in an aqueous liquid, or a hydrophilic organic liquid.

6. The compound of claim 1 wherein the D metal is at least one of the group consisting of Mg, Ca, Ba, Sr, Mn, Fe, Co, Ni, Cu, and Zn.

7. The compound of claim 1 wherein the D metal is Mg.

8. The compound of claim 1 wherein the T metal is at least o ne of the group consisting of Al, Ga, Cr, and Fe.

9. The compound of claim 1 wherein the T metal is Al.

10. The compound of claim 1 wherein the A anion is monovalent and the value of na is not zero.

11. The compound of claim 1 wherein the A anion is divalent and the value of na is not zero.

12. The compound of claim 1 wherein the A anion is trivalent and the value of na is not zero.

13. The compound of claim 1 wherein the A anion is polyvalent and the value of na is not zero.

14. The compound of claim 1 wherein the A anion is at least one selected from the group consisting of halide, sulfate, nitrate, phosphate, carbonate, glycolate, lignosulfate, and polycarboxylate.

15. The compound of claim 1 wherein the A anion is at least one inorganic anion.

16. The compound of claim 1 wherein the A anion is at least one hydrophilic organic anion.

17. The compound of claim 1 wherein D is Mg, T is Al, and A is an inorganic anion.

18. The compound of claim 1 wherein the compound is $MgAl(OH)_{4.7}Cl_{0.3}$.

19. The method of making compounds conforming essentially to the empirical formula of claim 1, said method comprising
preparing a solution of predetermined quantities of compounds which provide the desired predetermined amounts of Li, D, T, and A ions,
admixing said solution with an alkaline solution which provides a source of hydroxyl ions to cause coprecipitation of such Li, D, and T metals as crystalline mixed metal compounds containing, as anions, hydroxyl ions and A ions, said crystals being monodispersed and exhibiting monolayer unit cell structures as determined by crystallographic analysis,
said admixing being performed in a manner in which rapid, thorough, flash precipitation is achieved without the use of shearing agitation.

20. A gelled liquid agent for thickening process fluids, characterized by its thixotropicity and resistance to fluid loss, said gelled liquid agent comprising,
a major proportion of a liquid which is compatible or miscible with said process fluid, and
a minor proportion of monodispersed crystalline monolayer mixed metal hydroxide gellant which conforms substantially to the empirical formula
$Li_m D_d T(OH)_{(m+2d+3+na)} A_a^n$, where
m is the number of Li ions in the formula,
D represents divalent metals and d is the number of D ions in the formula,
T represents trivalent metal ions,
A represents monovalent or polyvalent anions or negative-valence radicals other than $OH^-$ ions, and a represents the number of A ions in the formula, with n representing a valence of 1 or more,
where m is from about zero to about 1,
d is from about zero to about 4,
(m+d) is greater than zero,
na is from zero to −3,
where (m+2d+3+na) is equal to or greater than 3, and
where said mixed metal hydroxides are characterized as being substantially monolayer unit cell crystals having a thickness in the range of about 8 to about 16 angstroms.

21. The gelled liquid agent of claim 20 wherein the value of m in the formula is in the range of about 0.5 to about 0.75.

22. The gelled liquid agent of claim 20 wherein the value of d in the formula is in the range of about 1 to about 3.

23. The gelled liquid agent of claim 20 wherein the liquid is an aqueous liquid.

24. The gelled liquid agent of claim 20 wherein the liquid is a hydrophilic liquid.

25. The gelled liquid agent of claim 20 wherein the liquid is dispersible or emulsifiable in an aqueous medium.

26. The gelled liquid agent of claim 30 wherein the value of a in the formula is in the range of about 0.1 to about 1.0.

27. The gelled liquid agent of claim 20 wherein the D metal in the formula is at least one of the group consisting of Mg, Ca, Ba, Sr, Mn, Fe, Co, Ni, Cu, and Zn.

28. The gelled liquid agent of claim 20 wherein the D metal in the formula is Mg.

29. The gelled liquid agent of claim 20 wherein the T metal in the formula is at least one of the group consisting of Al, Ga, Cr, and Fe.

30. The gelled liquid agent of claim 20 wherein the T metal in the formula is Al.

31. The gelled liquid agent of claim 20 wherein the A anion is monovalent and the value of na is not zero.

32. The gelled liquid agent of claim 20 wherein the A anion is divalent and the value of na is not zero.

33. The gelled liquid agent of claim 20 wherein the A anion is trivalent and the value of na is not zero.

34. The gelled liquid agent of claim 20 wherein the A anion is polyvalent and the value of na is not zero.

35. The gelled liquid agent of claim 20 wherein the A anion is at least one selected from the group consisting of halide, sulfate, nitrate, phosphate, carbonate, glycolate, lignosulfate, and polycarboxylate.

36. The gelled liquid agent of claim 20 wherein the A anion is at least one inorganic anion.

37. The gelled liquid agent of claim 20 wherein the A anion is at least one hydrophilic organic anion.

38. The gelled liquid agent of claim 20 wherein, in the formula, D is Mg, T is Al, and A is an inorganic anion.

39. The gelled liquid agent of claim 20 wherein the gellant is $MgAl(OH)_{4.7}Cl_{0.3}$.

40. The gelled liquid agent of claim 20 wherein the process fluid is a drilling fluid, a fracture fluid, a packer fluid, or a drilling mud.

41. The gelled liquid agent of claim 20 wherein the process fluid is one used in subterranean operations.

42. A method for producing dispersed flocs of monolayer metal hydroxide compounds conforming essentially to the formula
$Li_m D_d T_t(OH)_{(m+2d+3+na)} A_a^n$, where
m represents a quantity of from zero to 1,
D represents divalent metal
d represents a quantity of from zero to 4,
T represents trivalent metal cations,
t represents a quantity of from zero to 1,
A represents monovalent or polyvalent anions or negative-valence radicals other than $OH^-$ ions,
a is the amount of A ions of valence n,
na is a quantity of from zero to −3,
(d+t) is greater than zero,
(m+2d+3t+na) is equal to, or greater than equal to, 3t or 2d, whichever is greater,
said compounds being formed by merging, in a reaction zone, a measured or metered quantity of a metal cation-containing feed solution with a predetermined quantity of a hydroxyl ion-containing feed solution in a manner whereby rapid, intimate mixing is achieved in the reaction zone, while substantially avoiding shearing agitation which would break up the flocs which form during said mixing as a result of the reaction which occurs therein, removing the so-formed reaction mixture from the reaction zone ahead of subsequent measured or metered quantities of the feed solutions, thereby substantially avoiding the mixing, in the reaction zone, of the subsequent quantities of feed solutions with prior quantities of feed solutions, said method being carried out under substantially steady-state carried, using substantially constant conditions, in the reaction zone, of temperature, pH, and ratio of reactants, whereby the monolayer metal hydroxide compounds produced are characterized as being substantially monolayer unit cell crystals having a thickness in the range of about 8 to about 16 angstroms.

43. A composition for use as a drilling fluid component, said composition comprising a liquid having dispersed therein at least one monodispersed monolayer crystalline metal hydroxide conforming essentially to the empirical formula $Li_m D_d T(OH)_{(m+2d+3+na)} A_a^n$, where D represents divalent metal ions, T represents trivalent metal ions, A represents monovalent or polyvalent anions or negative-valence radicals other than $OH^-$ ions, m is from about zero to about 1, representing the amount of Li ion, d is from about zero to about 4, (m+d) is greater than zero, and na is from about zero to about $-3$; and a is an amount of A ions of valence n, where (m+2d+3+na) is equal to or greater than 3 wherein said drilling fluid also contains at least one fluid loss control agent.

44. The composition of claim 43 for use as a drilling fluid component, wherein said drilling fluid also contains at least one fluid loss control agent selected from the group consisting of hydroxyethylcarboxymethyl-cellulose, cornstarch, sodium-polyacrylate, starch, polyacrylates, and carboxymethyl-cellulose.

* * * * *

UNITED STATES PATENT AND TRADEMARK OFFICE
CERTIFICATE OF CORRECTION

PATENT NO. : 4,990,268
DATED : February 5, 1991
INVENTOR(S) : John L. Burba, III and Greene W. Strother It is certified that error appears in the above-identified patent and that said Letters Patent is hereby corrected as shown below:

Claim 1, line 45 of column 16, "(m+2+3+na)" should read --(m+2d+3+na)--.

Claim 8, line 66 of column 16, "o ne" should read --one--.

Claim 14, line 12 of column 17, "polycarboxylate" should read --polycarboxylic--.

Claim 26, line 11 of column 18, "30" should read --20--.

Claim 42, line 54 of column 18, after "metal", insert --cations, --.

Claim 42, line 13 of column 19, "carried" should read --conditions--.

Signed and Sealed this

Fifteenth Day of December, 1992

Attest:

DOUGLAS B. COMER

Attesting Officer    Acting Commissioner of Patents and Trademarks